H. BUNDEL.
Seed-Dropper.

No. 52,135.

Patented Jan. 23, 1866.

WITNESSES:

INVENTOR:
Henry Bundel
By atty A B Stoughton

UNITED STATES PATENT OFFICE.

HENRY BUNDEL, OF DAYTON, OHIO.

IMPROVEMENT IN SEEDING-MACHINES.

Specification forming part of Letters Patent No. 52,135, dated January 23, 1866.

*To all whom it may concern:*

Be it known that I, HENRY BUNDEL, of Dayton, in the county of Montgomery and State of Ohio, have invented certain new and useful Improvements in a Machine or Drill for Sowing Wheat, Rye, Oats, Barley, and other Grains or Seeds; and I do hereby declare that the following is a full, clear, and exact description of the same, reference being had to the accompanying drawings, making a part of this specification, in which—

Figure 1:
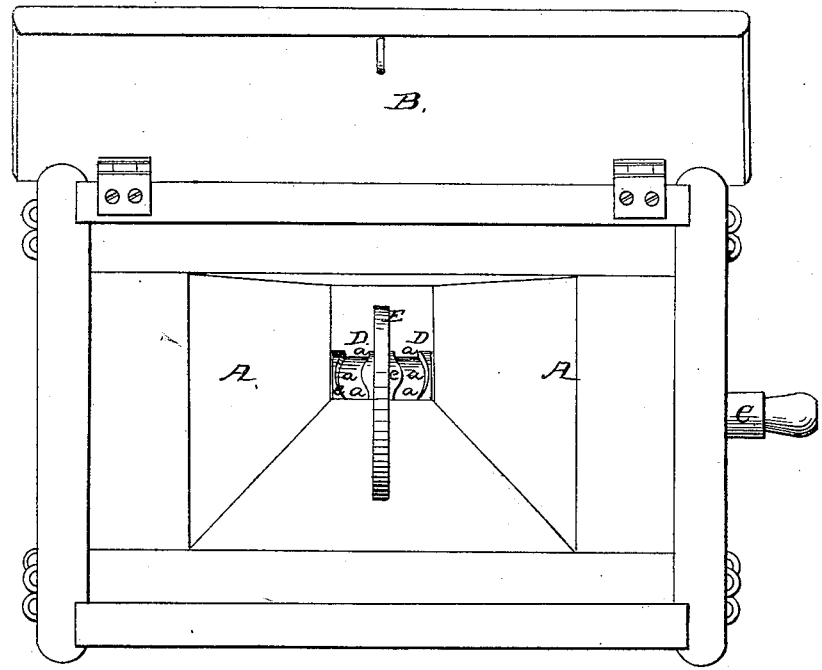
Figure 2:
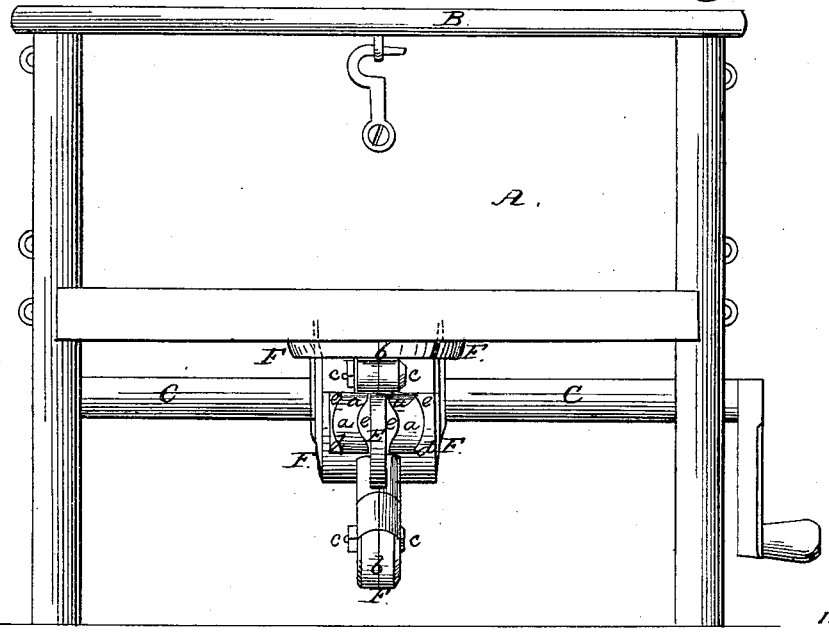

Figure 1 represents a top view of a portion of the hopper or seed-box, with the seeding apparatus in place. Fig. 2 represents a front elevation of the same.

Similar letters of reference, where they occur in the separate figures, denote like parts of the machine in both the drawings.

My invention consists in the combined use of a zigzag channel-feeder with an agitating-wheel, and arranged to operate in a divided cup and in the seed-hopper, so as to take up, carry around, and drop the seed or grain without allowing it to clog or bridge over the channels.

To enable others skilled in the art to make and use my invention, I will proceed to describe the same with reference to the drawings, first premising that though I have shown but one of the zigzag channels, agitating-wheels, and sectional cups, yet a series of the same may be used on the same or on different shafts, and the seeding device be mounted upon wheels, and otherwise furnished with all the appliances used on seed sowing or dropping machines in general.

A represents a hopper or seed-box furnished with a lid, B, in any of the usual well-known ways. Underneath the hopper or seed-box there is a shaft, C, which may be turned by the carrying or driving wheels by any suitable gearing. Under each opening D in the bottom of the seed-box there is formed, upon the shaft C, zigzag channels *a a*, extending entirely around said shaft, and between each set of channels, and upon the shaft, is placed an agitating-wheel, E, which prevents the grain from clogging over or near the channels, and more particularly prevents it from bridging and thus causing uncertain or irregular sowing. The agitating-wheel E projects some distance up into the hopper, and consequently a corresponding, or nearly so, distance below it, and below the hopper it is incased in a cup or shield, F, which is cast in two sections uniting at the line *b*, and the two sections, when properly placed, are held together by screwbolts *c*, which admits of their being readily put on around the shaft and agitator. The cup or shield F is secured to the bottom of the hopper, and is furnished with an exit-opening, *d*, through which the grain or seed may fall to the ground, or into seed-ducts and be conducted to the ground in the ordinary well-known way. That portion of the cup or shield F below the wheels or enlargements upon which the zigzag channels *a a* are made is closely incased by the shield, so that no seed or other material can enter between the wheel and case to choke the wheel.

The enlargements *e* on the shaft may be made separate from the shaft and slipped onto it and keyed on in any suitable manner, and the zigzag channels are formed in the peripheries of these wheels or projections or enlarged portions.

Having thus fully described the nature, object, and purpose of my invention, what I claim therein as new, and desire to secure by Letters Patent, is—

Combining with the shaft the sets of zigzag channeled wheels, and interposed agitating-wheel, working in the hopper and in the sectional case and shield below the hopper, substantially in the manner and for the purpose described.

HENRY BUNDEL.

Witnesses:
BARTON PICKERING,
THOS. D. MITCHELL.